Figures 1, 2, 3:
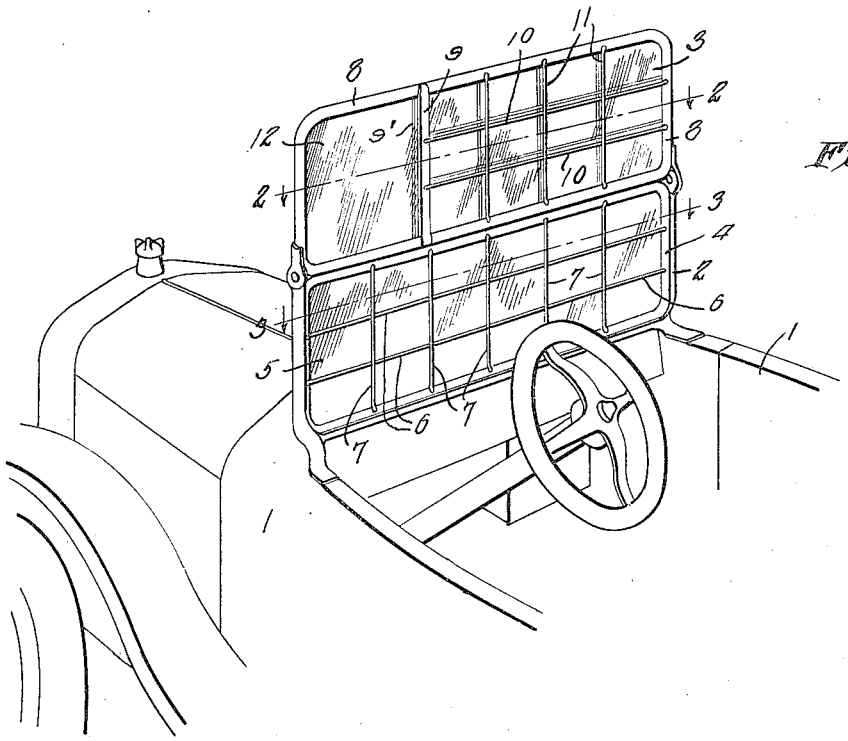

June 26, 1923.

A. C. McKINNON

WINDSHIELD PROTECTOR

Filed Oct. 24, 1921

1,459,834

Inventor

Angus C. McKinnon

By Bacon & Thomas

Attorney

Patented June 26, 1923.                                                  1,459,834

UNITED STATES PATENT OFFICE.

ANGUS C. McKINNON, OF MAXTON, NORTH CAROLINA.

WINDSHIELD PROTECTOR.

Application filed October 24, 1921. Serial No. 509,956.

*To all whom it may concern:*

Be it known that I, ANGUS C. MCKINNON, citizen of the United States of America, residing at Maxton, in the county of Robeson and State of North Carolina, have invented certain new and useful Improvements in Windshield Protectors, of which the following is a specification.

The invention relates to improvements in windshields.

In recent years, due to the increased use of motor vehicles, many serious injuries have resulted when accidents occurred because of the occupants or drivers of an automobile being thrown in contact with the windshield breaking the pane of glass and causing the infliction of severe and dangerous wounds. These injuries often result from sudden collisions, or when a motor vehicle overturns, throwing the occupants from the positions they occupy on the seats in contact with the glass.

It is an object of this invention to provide a windshield wherein the occupants of a vehicle will be protected from being wounded or injured by being forced through the panes of glass within the windshield frame. With this conception in mind, the invention primarily consists of a windshield wherein the glass panes are protected by strong wire strands, which strands serve as a guard to prevent a person from being forced through the glass panes of the shield. In carrying out my invention the metallic strands preferably extend horizontally across the windshield and are attached to the sides of the windshield frame. These strands are so disposed on the upper shoulder as to leave a space immediately in front of the driver free of protecting wires to permit a free vision, the driver of course being largely prevented from being thrown through the windshield by the steering wheel.

In the accompanying drawings I have shown a single embodiment of the invention, but this disclosure is only for the purpose of illustration, and many changes can be made without departing from the spirit of this invention.

In the drawings, Figure 1 represents the device applied to an automobile. Figure 2 is a sectional view taken on the line 2—2 of Figure 1 and Figure 3 is a sectional view taken on the line 3—3 of Figure 1.

Referring now more particularly to the drawings, wherein like reference characters indicate corresponding parts, the numeral 1 designates a motor vehicle which may be of any well known type. Positioned in front of the driver's seat of the vehicle is a windshield comprising a section 2 permanently secured to the vehicle in the usual manner. To this section is hinged the upper section 3, the present type of windshield being one similar to that used on the Ford car. The section 2 has the frame member 4 extending therearound receiving the windshield glass panel 5. Welded or otherwise connected to this frame member are a plurality of transverse wires 6 extending entirely across the pane 5, these wires being of a relatively strong material. Vertically disposed wires 7 also intersect the wires 6, being united thereto if desirable, the said vertical wires 7 being welded to the upper and lower frames of the lower panel of the shield.

In the disclosure shown in the accompanying drawings, the section 2 of the shield is provided with protecting wires 5 and 7 only on the interior face of the pane, although I wish it to be distinctly understood that a light set of wires can be applied to the outer face of the pane if desired.

The upper hinged panel 3 of the shield likewise has a metallic frame 8, the said panel being hinged to the lower panel 2, and is adapted to be drawn from a raised to a lowered position. Intermediate the ends of this panel is a metallic member 9 vertically disposed and connected with the upper and lower frame portions of the panel 3. Extending from this member to one side of the panel are the horizontal protecting wires 10, while vertical protecting wires 11 are also provided intersecting the wires 10 and connected to the upper and lower frames of the panel 3. The wires 10 and 11 are welded or connected in any convenient manner to the frame members.

In view of the fact that in a Ford car the upper shield swings inwardly when lowered I preferably apply the protecting wires 10 and 11 to both the inner and outer surfaces of the pane 3. When this is done a second element 9' of the same construction as the element 9 is disposed upon the outside of the pane and the wires 10 and 11 connected as heretofore disclosed.

It will be observed that by employing the elements 9 and 9' a clear vision space 12 is provided at one corner of the shield, which permits the operator of a vehicle to have a clear vision when the shield is raised. This is possible, inasmuch as the clear vision portion 12 of the shield is immediately in front of the supporting wheel and steering column, which serve to prevent a driver from being forced through the shield, while of course said column and steering wheel do not in any way protect other occupants from being thrown into contact with the shield. Various means may be employed for securing the protecting wires in position, and these wires may be composed of different kinds of material.

From the foregoing description it will be observed that I have provided a windshield wherein the occupants of the vehicle are prevented from being thrown through the windshield glass in the case of accident, and that such protecting means does not materially hamper the free vision of the driver or any of the occupants of the car.

Having thus described the invention, what I claim is:

A windshield, comprising a metallic frame and glass pane therein, horizontally and vertically disposed metallic elements connected with said frame and extending across the panel, said elements lying adjacent the surfaces of said glass pane and having their free ends rigidly united in position, the metallic elements at one side of the frame positioned in front of the driver's seat, being arranged so as to leave that portion of the glass pane uncovered to provide a clear vision space.

In testimony whereof I affix my signature.

ANGUS C. McKINNON.